Oct. 13, 1953  R. A. LIGHTBURN ET AL  2,655,075
PROJECTOR SLIDE FILM CHANGER
Filed Jan. 2, 1951
2 Sheets-Sheet 1
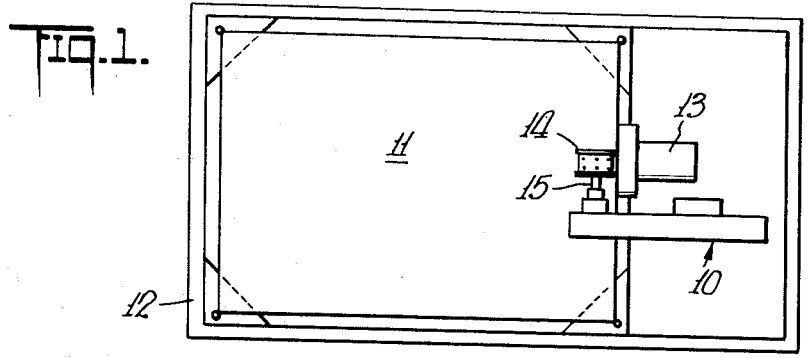
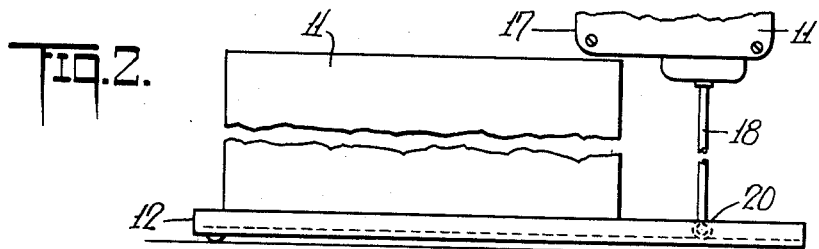
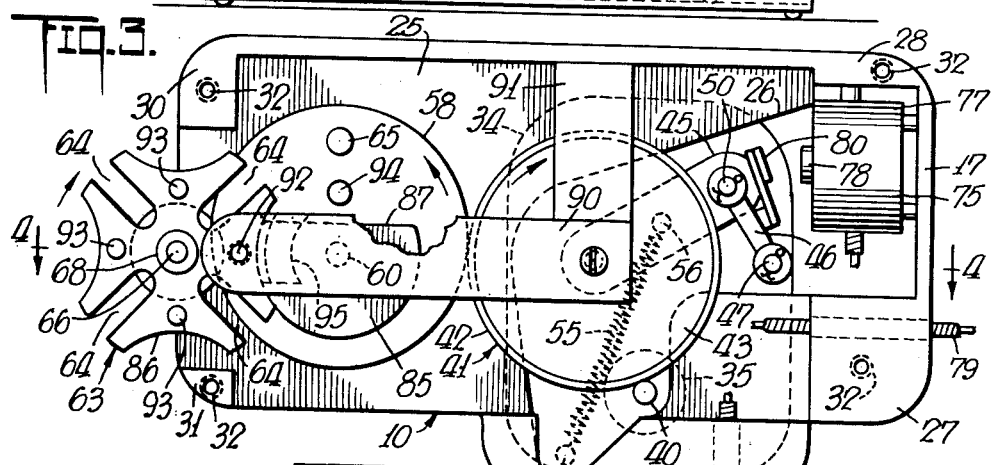
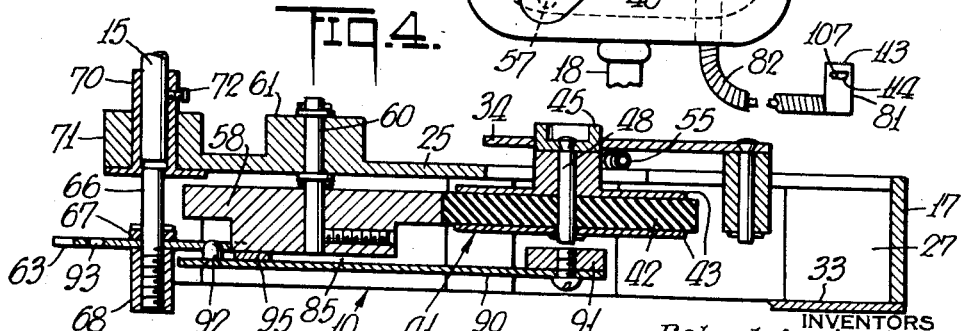
INVENTORS
Robert A. Lightburn
Mervyn W. Palmer
BY
Augustus Semma
ATTORNEY

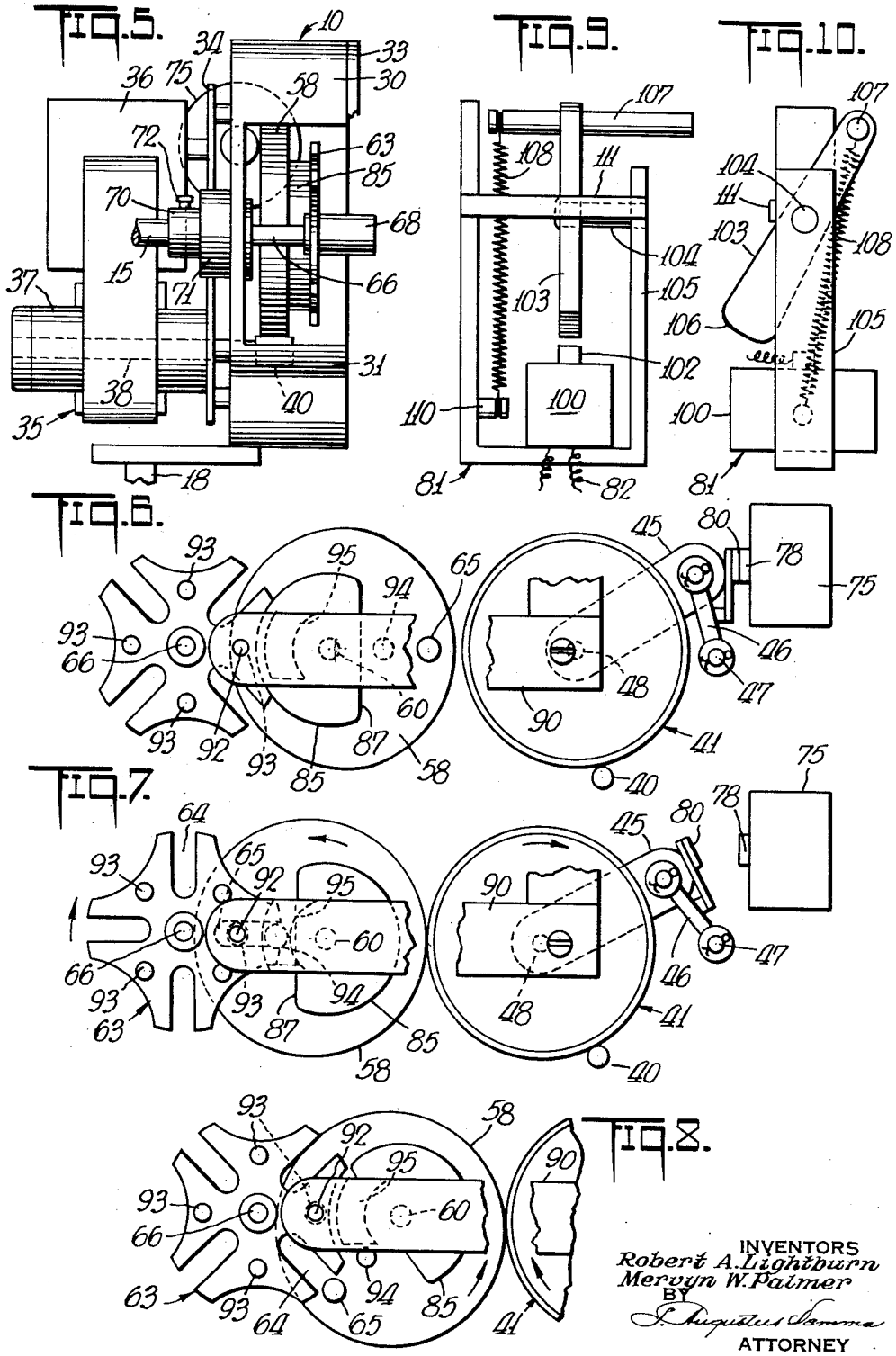

Patented Oct. 13, 1953

2,655,075

UNITED STATES PATENT OFFICE 2,655,075

PROJECTOR SLIDE FILM CHANGER

Robert A. Lightburn, Fayson Lakes, N. J., and Mervyn W. Palmer, New York, N. Y., assignors to American Optical Company, Southbridge, Mass., a voluntary association of Massachusetts Application January 2, 1951, Serial No. 203,904

11 Claims. (Cl. 88—28)

1

The present invention relates to a slide film changing attachment for a projector of the type in which a film carrying successive frames or slides is movable step by step by a feed sprocket wheel to bring the successive frames into a projection position. The present invention relates particularly to an attachment for such a projector having means by which the intermittent movement of a feed sprocket for frame changing may be manually controlled to move the feed sprocket one step when a change is desired and to move thereby the next frame on the slide film into projecting position. This attachment includes a Geneva device for moving the slide film through an amount equal to one frame. It is important that the star wheel of the Geneva device be rotated exactly one step of predetermined extent, when a frame change is indicated, so that the next view is brought into exact registry for projection on the screen and that this wheel be locked in the intervals between view changing operations. Otherwise, the Geneva star wheel may be accidentally displaced during these intervals causing the view being projected to be displaced out of screen registry and bringing thereby the star wheel out of proper rotative relationship with respect to a pin carrying drive wheel of the Geneva device.

The ordinary Geneva device has a locking disc rotatable with the pin carrying drive wheel and having its circular periphery movable into conforming contact with the circularly concave peripheral conformations of the Geneva star wheel between its points. This locking disc has a segmental cut-out movable opposite the star wheel in position to release said star wheel for rotation when slide film change is indicated. This locking disc is not always effective during the transitional periods at the beginning and end of each cycle of rotation of the Geneva star wheel.

One object of the present invention is to provide a new and improved frame changing attachment for a slide film projector having means by which movement of the frame slides successively through manual control into proper projection position is assured and the maintenance of the selected frames or slides in this position during the periods between slide film changing control manipulations is made certain.

A further object is to provide a frame changing attachment for a slide film projector having a Geneva movement with new and improved means for assuring the locking of its star wheel in fixed position during the periods between frame changing operations.

2

Another object is to provide new and improved switch means for manually controlling the operation of the slide film changer.

Another object is to provide a frame changing device having braking means associated therewith to assure against the overrun of certain of its rotative parts beyond proper stopping position at the end of each frame changing operation.

A still further object is to provide a slide film changing device in the form of a compact self-contained unit which can be attached to or removed from a projector as such, and which lends itself to positional adjustment with respect to the projector according to the type, elevation or inclination of the projector.

Various other objects of the invention are apparent from the following particular description and from an inspection of the accompanying drawings, in which—

Figure 1 is a top plan view of a projector showing diagrammatically the slide film changer of the present invention attached thereto;

Figure 2 is a fragmentary side elevation of the projector showing diagrammatically the slide film changer attached thereto;

Figure 3 is a side view of the slide film changer embodying the present invention and shown with the cover of its casing removed or broken away and during the period when the film feed sprocket is being rotated to bring the next frame slide on the film into projection view;

Figure 4 is a section of the slide film changer taken approximately along the lines 4—4 of Fig. 3;

Figure 5 is an end view of the slide film changer;

Figure 6 is a side view of the operating mechanism of the changer shown during normal inactive periods when a frame or slide is in projection view;

Figure 7 is a side view of the operating mechanism of the changer shown after the changing of frames on the slide film has been manually initiated and while one frame or slide is moving out of projection view and the next frame or slide is moving into projection view;

Figure 8 is a fragmentary side view of the operating of the changer shown right after the next frame or slide has completed its movement into projection view;

Figure 9 is a side view of the switch for manually controlling the operating of the slide film changer; and Figure 10 is a front view of the switch.

Referring to Figs. 1 and 2 of the drawings, the slide film changer 10 embodying the present invention is shown for purposes of illustration applied to a conventional projector 11 of the portable type. This projector 11 is supported on a base 12 and when not in use is enclosed in a casing (not shown) secured to said base. The projector 11 has an optical projection objective 13 and a feed sprocket 14 for actuating slide or strip film (not shown) to be projected on a screen. The feed sprocket is secured to a shaft 15. The film carries in its successive frames the different views or slides.

The slide film changer 10 is adapted to be supported in proper position with respect to the projector 11 and to be removably secured to the feed sprocket shaft 15. This slide film changer 10 has a casing 17 to which a leg 18 telescopically constructed for lengthwise adjustment is removably secured as for example, by screwing into the bottom of the casing. The lower end of this leg 18 has a wheel 20 adapted to be supported on the projector base 12 in mounted attached position of the slide film changer 10. Between its point of attachment to the feed sprocket shaft 15 and the leg 18, the slide film changer 10 is stably supported and may be tilted about the axis of the feed sprocket shaft 15 to accommodate said slide changer to different types of projectors and to different elevations or inclinations of the projector with respect to its base 12.

The slide film changer 10 shown in Figs. 3 to 8 includes the frame casing 17 having a rear wall 25 with an opening 26 to permit certain parts of the operating mechanism of the changer to project therethrough and corners 27, 28, 30 and 31 provided with tapped holes 32 for removably attaching a cover plate 33 to said casing. Secured to the rear wall 25 is a frame plate 34 to which is fastened a motor 35 having coils 36, an armature 37 and a shaft 38. This motor shaft 38 carries a roll 40 in continuous friction drive engagement with a wheel 41 shown comprising a disc 42 of elastomeric material such as rubber held between two metal discs 43 and having its periphery in driven engagement with the friction roll 40. The wheel 41 has a floating mount and for that purpose is supported on one end of a link 45, the other end being connected to an arm 46 on a fixed pivot support 47. The mounting for the friction wheel 41 on the link 45 is shown comprising an axle pin 48 rigidly secured to the link 45 as for example by riveting and supporting the friction wheel for free rotation thereabout. The friction wheel 41 may be provided with a suitable bushing (not shown) for bearing embracement of the axle pin 48.

The pivot connection between the arm 46 and the link 45 is shown comprising a pivot pin 50 rigidly secured to the link 45 as for example by riveting and rotatively embraced by one end of said arm. The fixed pivot support 47 for the other end of the arm 46 is shown in the form of a pin affixed to the motor frame plate 34, as for example by riveting and rotatively embraced by said arm.

A spring 55 has one end secured to the link 45 at 56 and the other end anchored in fixed position at 57 to the motor frame plate 34 and serves to urge the friction wheel 41 in peripheral friction drive engagement with an eccentric wheel 58 mounted for rotation on a shaft 60 journalled in a fixed bearing 61 forming part of the rear casing wall 25. This eccentric wheel 58 serves as the pin carrying drive wheel of a Geneva movement comprising a four point star wheel 63 formed with radial slots 64 at each point and adapted to be turned step by step by a tooth or pin 65 on said eccentric wheel moving into said slots. This star wheel 63 is removably secured to a shaft 66 by means of a collar 67 and a clamping nut 68. A coupling sleeve 70 rigid with the star wheel shaft 66 is journalled in a fixed bearing 71 forming part of the rear casing wall 25 and projects beyond said bearing to permit the shaft 15 of the feed sprocket 14 to be inserted therein. A set screw 72 in the coupling sleeve 70 serves to lock the two shafts 15 and 66 for rotation in unison.

The rotation of the star wheel shaft 66 and in turn the feed sprocket shaft 15 is controlled remotely by an operator or lecturer by manipulating a switch 81 (Figs. 9 and 10). Toward that end, there is provided an electromagnet 75 supported in the casing 17 and consisting of a coil 77 and a pole 78. Connected to the arm 46 is an armature 80 adapted to be attracted by the magnet pole 78. The electromagnet 75 as well as the motor 35 are connected in parallel to a source of current through a conductor 79 passing through one of the casing corners 27 and adapted to be plugged into a wall outlet (not shown). The circuit of the magnet coil 77 is controlled by the switch 81 connected to the end of a long conductor cord 82 in said coil circuit also passing through a casing wall.

The motor 35 is continuously operating and the magnet 75 is ordinarily continuously magnetized, so that the armature 80 is normally in contact with the magnet pole 78. The wheel 41 will thereby be drawn by the linkage 45, 46 against the action of the spring 55 about the motor roll 40 as a center and away from drive contact with the eccentric wheel 58 of the Geneva movement, and thus into the inactive or non-driving position shown in Fig. 6. Under these conditions, even though the motor 35 is operating and the wheel 41 in contact therewith is rotating, the drive to the Geneva movement is interrupted and the Geneva star wheel 63 connected to the feed sprocket 15 will be stationary. In this position of the slide film changer, a frame or slide on the film will register with the objective of the projector and the view of said frame will be projected in fixed position on the screen. When the operator or lecturer desires to change the view, he operates the switch 81 to open the circuit of the magnet 75. This action momentarily deenergizes the magnet 75 and releases the armature 80. This action causes the rotating wheel 41 to be released for movement into drive engagement with the eccentric wheel 58 of the Geneva movement by the action of the spring 55; into the position shown in Fig. 3. The eccentric wheel 58 thereafter continues its rotation into position shown in Fig. 7 and then into position shown in Fig. 8. This causes the Geneva star wheel 63 to be rotated one step of 90° and the film to be moved thereby one step to bring the next frame into projecting register. In the position shown in Fig. 8, the Geneva star wheel 63 has terminated its one step movement but the eccentric wheel 58 continues its movement towards the inactive position shown in Fig. 6.

The switch 81 after it is manipulated into circuit opening position to deenergize the magnet 75 and thereby to initiate operation of the Geneva movement is returned into circuit closing position even before the Geneva movement has completed its one step operation. The eccentric wheel 58, after the Geneva star wheel 63 has stopped and while it is in the rotative position shown in Fig. 6, will have its side of maximum throw closest to the floating wheel 41. In this position, the wheel 41 will be out of drive contact with the eccentric wheel 58 as a result of the attraction of the magnet pole 78 for the armature 80. After the switch 81 has been opened and the wheel 41 has been released into drive engagement with the eccentric wheel 58, the rotation of said eccentric wheel counterclockwise (Fig. 6) will move the side of maximum throw of the eccentric wheel away from the wheel 41, so that said wheel 41 will be moved by the action of the spring 55 towards the left in follower engagement with said eccentric wheel. This moves the armature 80 on the arm 46 away from the magnet pole 78. Therefore, even if the switch 81 is returned to circuit closing position, the tractive force between the magnet pole 78 and the armature 80 is not sufficient because of the distance between the pole and the magnet to pull the wheel 41 away from friction drive engagement with the eccentric wheel 58. This tractive force is not sufficient for that purpose until the eccentric wheel 58 is returned substantially into rotative position shown in Fig. 6 with its side of maximum throw in contact with the wheel 41. At that instant, since the magnet 75 is energized, its tractive force is sufficient to attract the armature 80 and to move the wheel 41 out of contact with the eccentric wheel 58 into the inactive position shown in Fig. 6. Therefore, once the switch 81 has been opened, the complete circuit of the eccentric wheel 58 through one revolution and the rotation of the Geneva star wheel 63 one quarter revolution is assured. In the operation for changing a frame or slide, the switch 81 is first opened to start movement of the eccentric wheel 58 and before the wheel has completed its circuit the switch is closed. The switch 81 is particularly designed to afford a time lag during switch opening operations and permit easy movement into open and closed position, as will be more fully described.

The ordinary Geneva movement has a locking disc curved to the same radius as the Geneva star wheel between its slots and engaging said wheel to prevent its rotation during the time the drive pin or tooth is out of engagement with said wheel. In the present construction, this locking device is shown in the form of a disc 85 integral with the eccentric wheel 58 and concentric with the shaft 60 of said eccentric wheel. The Geneva star wheel 63 between its points has circularly concave edges 86 and the locking disc 85 is circular except for a segmental cut-out 87 which is movable into position opposite the star wheel to release said star wheel for rotation during the drive engagement of the drive pin 65 therewith.

In the transitional periods just before the drive pin 65 moves into engagement with the star wheel 63 and just after the drive pin moves out of engagement with the star wheel, the star wheel is released from locking engagement with the locking disc 85, as shown in Fig. 8. During these intervals, the star wheel 63 may be accidentally displaced out of proper rotative relationship with respect to the eccentric drive wheel 58. The slide on view may thereby be displaced out of projection registry and the re-engagement of the drive pin 65 with the star wheel 63 may be blocked in the next slide changing cycle. To assure against such conditions, there is provided a latch device automatically operable to lock the star wheel 63 during the entire periods when the wheel is released from engagement with the drive pin 65. This latch device comprises a spring bar 90 fixed at one end to a frame piece 91 secured to the casing 17 and carrying at its other free end a locking pin 92 adapted to snap into any one of four holes 93 quadrantly arranged on the star wheel 63 between its points to lock thereby said wheel against rotation as the hole moves into registry with said pin. For releasing the star wheel 63 for rotation, the eccentric wheel 58 carries a cam pin 94 adapted to ride along a wear plate 95 on the inner side of the spring bar 90 during certain periods of the cycle when the drive pin 65 is moving into engagement with the star wheel 63. This cam pin 94 has a rounded or cam conformation at its end to move by this action the free end of the spring bar 90 away from the star wheel 63 against its inherent resiliency. This causes the locking pin 92 on the spring bar 90 to be moved out of the hole 93 in the star wheel 63 and the star wheel to be released for rotation.

By means of the plate 95, the cam pin 94 is able to clear the spring bar 90 while said pin is travelling on the side of its orbit diametrically opposite said plate. This plate 95 is desirably provided with short bevels at its ends to facilitate riding action of the cam pin 94 on and off said plate without delaying releasing and locking action of the locking pin 92.

The cam pin 94 is located on the eccentric wheel 58 in position to effect the release of the locking pin 92 out of the hole 93 just after the drive pin 65 has entered a slot 64 in the star wheel 63 to an extent sufficient to interlock the star wheel and the drive pin. The location of the cam pin 94 is also such as to release the spring bar 90 a little before a hole 93 in the star wheel 63 comes into register with the locking pin 92 and just before the drive pin 65 leaves a slot 64. For that purpose, the locking pin 92 is in the radial line of the drive pin 65. Just as soon as the hole 93 reaches registered position with respect to the locking pin 92, this pin snaps into the hole and locks the star wheel 63 against further rotation.

The plate 95 on which the cam pin 94 rides may be foreshortened at one end as shown or may be so bevelled at this end to permit the free end of the spring bar 90 to move towards the star wheel 63 even before the star wheel has completed its cycle. Under these conditions, the locking pin 92 which has been moved out of one hole 93 will yieldably bear with slight pressure against the face of the star wheel 63 without interfering with the completion of its cycle until the next hole 93 comes into registry with said locking pin. At that instant, the locking pin 92 snaps into the latter hole, as shown in Fig. 8.

The latch device described is more accurate and positive in its operations at the beginning and end of each rotative cycle of the star wheel 63 than is the locking disc 85 and can be employed to supplement the locking action of said locking disc, as shown, or if desired the locking disc may be dispensed with and the latch device depended on entirely to effect the locking and release of the star wheel 63 at the proper times in the cycle.

The switch 81 is constructed to assure the opening of the circuit of the magnet 75 for a period long enough to rotate the eccentric wheel 58 into position to move the armature 80 a sufficient distance away from the pole 78, so that when the closing of the circuit is reestablished, the power of the magnet will not be sufficient to attract the armature. The switch 81 so designed assures the complete revolution of the eccentric wheel 58 before coming to rest. Towards that end, the switch 81 shown in Figs. 9 and 10 comprises a pair of contacts (not shown) in the magnet circuit enclosed in a housing 100 and normally closed by a spring (not shown). A spring-pressed plunger or button 102 for separating the contacts into circuit opening position upon depression thereof projects from the housing 100. For depressing the plunger 102 into circuit opening position, there is provided a lever 103 mounted on a pivot pin 104 which is secured to a frame post 105 and which supports the lever for rotation thereabout. One end of this lever 103 presents a long cam surface 106 adapted to ride over the plunger 102 and depress said plunger into circuit opening position. The other end of the lever 103 carries a handle 107. A spring 108 is connected at one end to the handle 107 and at the other end to a fixed anchor 110 and is arranged to snap into either side of the pivot pin 104 into inactive positions in which the circuit is closed. These extreme positions are determined by a stop bar 111 connected to the frame structure of the switch and adapted to engage the lever 103 in either position.

The switch 81 may be enclosed in a casing 113 as shown in Fig. 3, with the handle 107 extending through an elongated slot 114 in the casing.

In the operation of the slide film changer, the switch 81 is on one of its circuit closing positions shown in Fig. 10, so that the magnet 75 is energized and the parts of the changer are in the inactive position shown in Fig. 6. When the operator desires to change the film frame or slide, he moves the lever 103 from one extreme position to its other. During this operation, the lever 103 cams the plunger 102 inwardly against the action of its spring (not shown) and opens the magnet circuit for a short interval of time. This operation releases the floating wheel 41 and permits it to be moved by the action of the spring 55 towards the left into driving contact with the eccentric wheel 58. The eccentric wheel 58 thereby starts rotating counterclockwise.

The circuit of the magnet 75 remains open just as long as the cam surface 106 on the lever 103 is riding over the plunger 102. Since this cam surface 106 is of substantial length, the opening of the magnet circuit is assured for a period long enough to cause the eccentric wheel 58 to rotate counterclockwise from the normal inactive position in Fig. 6 an angular distance sufficient to move wheel 41 and linkage 45, 46 to the left enough to render the magnet 75 ineffective because of the distance of the armature 80 from the magnet pole 78, even if the circuit of said magnet should be closed again. Therefore, after the lever 103 has moved beyond the circuit opening position described and has snapped into extreme position in which the plunger 102 is released again and the switch 81 is closed, the eccentric wheel 58 will nevertheless continue to rotate counterclockwise to rotate the star wheel 63 one quarter revolution, and until said eccentric wheel substantially reaches the rotative position shown in Fig. 6. At this time, the armature 80 will be sufficiently close to the magnet pole 78 to be attracted thereby. This addition moves the floating wheel 41 out of drive contact with the eccentric wheel 58 and wheel 41 will remain in this inoperative position until the lever 103 in the switch 81 is swung into the opposite extreme position by the operator when he desires a change of views.

It is desirable for the eccentric wheel 58 to stop approximately in the position shown in Fig. 6 at the end of each slide changing operation. After the eccentric wheel 58 has moved beyond the position shown in Fig. 8 where it is free from the restraining influence of the star wheel 63, it has a tendency to race and unless it is retarded it may overrun its desired stopping position shown in Fig. 6. For that reason, the spring bar 90 is arranged to apply a braking action to the eccentric wheel 58 through the plate 95 secured thereto. This plate 95 bears against the locking disc 85 through the inherent resiliency of the spring bar 90. The force with which this plate 95 bears against the locking disc 85 may be adjusted by adjustment of the anchored end of the spring bar 90 through an adjusting screw at this end, or if desired, a washer may be employed in connection with the screw securing said spring bar 90 to the frame piece 91 to adjust the braking pressure on the locking disc.

It should be noted that the slide film changer of the present invention is in the form of a compact self-contained unit separate from the projector and is easily attachable thereto and easily removable therefrom as a unit.

While the invention has been described with particular reference to a specific embodiment, it is to be understood that it is not to be limited thereto but solely by the scope of the appended claims.

What is claimed is:

1. In a slide changer, a Geneva movement for operating a film feed shaft step by step and comprising a star wheel, a drive wheel having a drive tooth for said star wheel, latch means for locking said star wheel automatically against rotation when said tooth moves out of drive engagement with said star wheel and including a relatively thin wide elongated spring bar fixed at one end to a fixed part of said slide changer and urged towards said star wheel at its other end by its inherent resiliency, and a pin and hole connection between the free end of said bar and said star wheel to lock said star wheel, a part of said bar being disposed adjacent said drive wheel and having an engagement surface thereon, and a cam pin on said drive wheel disposed so as to engage said engagement surface for camming the free end of said bar away from said star wheel substantially as said tooth moves into drive engagement with said star wheel to release said star wheel for rotation under the control of said tooth.

2. In a slide changer, a Geneva movement for operating a film feed shaft step by step, a motor-driven wheel for driving said Geneva movement, a magnet, an armature mounted in position to be attracted by said magnet when said armature is within a predetermined distance from the pole of said magnet, a floating mount for said drive wheel permitting said drive wheel to be moved towards and away from drive engagement with said Geneva movement, means connecting said armature and said drive wheel in relationship to cause said armature to move away from said magnet pole as said drive wheel moves towards drive engagement with said Geneva movement and to hold said drive wheel out of drive engagement with said Geneva movement while said magnet is attracting said armature, means for moving said armature away from said pole beyond attracting distance and then back towards said pole within attracting distance as said drive wheel is operating said Geneva movement, and switch means for controlling the circuit of said magnet to permit slide changes and comprising means for normally maintaining said circuit closed and manually movable means operable by a single manipulation to open said circuit for a substantial length of time and to then close said circuit, wherein the switch means comprises contacts normally closed by spring action, a plunger depressible to separate said contacts and a plunger depressor having a cam surface of substantial length adapted to be manipulated into engagement with said plunger to depress said plunger as said depressor is moved from one position to another.

3. In a slide changer, a Geneva movement for operating a film feed shaft step by step, a motor-driven wheel for driving said Geneva movement, a magnet, an armature mounted in position to be attracted by said magnet when said armature is within a predetermined distance from the pole of said magnet, a floating mount for said drive wheel permitting said drive wheel to be moved towards and away from drive engagement with said Geneva movement, means connecting said armature and said drive wheel in relationship to cause said armature to move away from said magnet pole as said drive wheel moves towards drive engagement with said Geneva movement and to hold said drive wheel out of drive engagement with said Geneva movement while said magnet is attracting said armature, means for moving said armature away from said pole beyond attracting distance and then back towards said pole within attracting distance as said drive wheel is operating said Geneva movement, and switch means for controlling the circuit of said magnet to permit slide changes and comprising means for normally maintaining said circuit closed and manually movable means operable by a single manipulation to open said circuit for a substantial length of time and to then close said circuit, said manually movable means comprising a plunger depressible to separate said contacts and a plunger depressor having a cam surface of substantial length thereon adapted to be manipulated into engagement with said plunger as said depressor is moved from one inactive position to another, said switch means comprising spring means for snapping said depressor into either one of two inactive positions in which the plunger is released.

4. In a slide film changer, a Geneva movement for operating a film feed shaft step by step and comprising a star wheel, a drive wheel having a drive tooth for engaging said star wheel, latch means for locking said star wheel automatically against rotation when said tooth moves out of drive engagement with said star wheel and including an elongated thin wide bar having one end secured to a fixed part of said changer and having its opposite end free for resilient movement towards and away from a side of said star wheel and urged towards said star wheel, and a pin and hole connection between said bar and said side of said star wheel to lock said star wheel, cam means carried by a side of said drive wheel for camming said bar into position to interrupt said pin and hole connection automatically when said tooth moves into drive engagement with said star wheel, said drive wheel being eccentrically mounted for rotation, a motor-driven wheel movable into operative engagement with said drive wheel, the eccentricity of said drive wheel being effective during rotation thereof to move said motor-driven wheel into a non-driving position each time said star wheel completes one forward step for advancing film, and release holding means for holding said motor-driven wheel in said non-driving position.

5. In a slide film changer, a Geneva movement for operating a film feed shaft step by step and comprising a star wheel, a drive wheel having a drive tooth for engaging said star wheel, latch means for locking said star wheel automatically against rotation when said tooth moves out of drive engagement with said star wheel and including an elongated thin wide bar having one end secured to a fixed part of said changer and having its opposite end free for resilient movement towards and away from a side of said star wheel and urged towards said star wheel, and a pin and hole connection between said bar and said side of said star wheel to lock said star wheel, a locking disc carried by said drive wheel and successively closely fitting recessed portions of said star wheel after each step by step operation thereof, cam means carried by a side of said drive wheel for camming said bar into position to interrupt said pin and hole connection automatically when said tooth moves into drive engagement with said star wheel, said drive wheel being eccentrically mounted for rotation, a motor-driven wheel movable into operative engagement with said drive wheel, the eccentricity of said drive wheel being effective during rotation thereof to move said motor-driven wheel into a non-driving position each time said star wheel completes one forward step for advancing film, and release holding means for holding said motor-driven wheel in said non-driving position.

6. In a slide film changer, a Geneva movement for operating a film feed shaft step by step, a continuously rotating electric motor driven wheel for driving said Geneva movement, energized electro-magnet means for normally maintaining said wheel out of drive engagement with said Geneva movement, a circuit for supplying current to said electro-magnet means, spring means constantly urging said wheel toward drive engagement with said Geneva movement, switch means for controlling the current to said electro-magnet means to permit slide changes, said switch means comprising contact means for normally maintaining said circuit closed, a plunger for opening said contacts, and manually movable means having camming engagement with said plunger and opening said circuit for a substantial length of time so as to allow said spring means to move said wheel out of the holding influence of said electro-magnet means and to then close said circuit, and means on said Geneva movement for returning said wheel to its non-driving position after each slide changing operation.

7. In a slide film changer, a Geneva movement for operating a film feed shaft step by step including a star wheel and a toothed wheel for driving said star wheel, continuously rotating electric motor driven means for driving said toothed wheel, means for interrupting the drive from said motor driven means to said toothed wheel, brake means having a part rotatable with said toothed wheel and a non-rotatable part positioned adjacent the toothed wheel, said parts being normally disengaged from each other but movable into mutual engagement after the toothed wheel starts to rotate for retarding the rotation of said toothed wheel after it has rotated out of drive relation with respect to said star wheel and is free from said electric motor driven means.

8. In a slide film changer, a Geneva movement for operating a film feed shaft step by step including a star wheel and a toothed wheel for driving said star wheel, continuously rotating electric motor driven means for driving said toothed wheel, latch means for locking said star wheel against rotation automatically when said star wheel is free from drive control of said toothed wheel, means for interrupting the drive from said electric motor driven means to said toothed wheel by disengaging the former from said toothed wheel, and brake means carried by said latch means having a part rotatable with said toothed wheel and a non-rotatable part positioned adjacent the toothed wheel, said parts being normally disengaged from each other but movable into mutual engagement after the toothed wheel starts to rotate for retarding the rotation of said toothed wheel after it has rotated out of drive relation with respect to said star wheel and as said electric motor driven means is being disengaged therefrom.

9. In a slide changer, a Geneva movement for operating a film feed shaft step by step and comprising a star wheel, a drive wheel having a drive tooth for actuating said star wheel, continuously rotatable electric motor driven means for driving said drive wheel, means for disengaging and interrupting the drive from said electric motor driven means to said drive wheel, latch means for locking said star wheel automatically against rotation substantially as said drive tooth moves out of drive engagement with said star wheel, said locking means including an elongated bar fixedly mounted adjacent one end thereof to a fixed part of said changer and having its opposite end free and arranged for resilient movement towards said star wheel, a pin and hole connection between the free end portion of said bar and said star wheel to lock said star wheel against rotation, and a braking member carried by an intermediate portion of said bar and normally out of engagement with said drive wheel but pressing against said drive wheel with spring action to retard the rotation of said drive wheel after it has rotated out of drive relation with respect to said star wheel and while said electric motor driven means is disengaged.

10. A slide film changer for attachment to the film feed shaft of a slide film projector, said slide film changer comprising a casing, a Geneva movement in said casing for operating said film feed shaft step by step, a motor driven wheel for driving said Geneva movement, an electric motor carried by said casing and operatively engaging said driven wheel, electro-magnet means in said casing for releasably holding said driven wheel out of driving engagement with said Geneva movement, said casing mounting said Geneva movement, said driven wheel, said electric motor and said electro-magnet means in a self-contained unit adapted to be readily attached to the projector film feed shaft in operative position as a unit, said Geneva movement comprising a star wheel within one end of said casing, means extending externally of said casing for coupling said star wheel to said film feed shaft, and a leg secured to said casing toward an opposite end thereof for supporting said unit in operative position with respect to said projector.

11. A unitary slide film changer adapted to be readily detachably connected to a rotatable strip film feed shaft of a projector, said changer comprising a Geneva movement for operating said film feed shaft step by step, an electric motor and a motor driven wheel for driving said Geneva movement, electro-magnet means for interrupting the transmission of power from said driven wheel to said Geneva movement, frame means mounting said Geneva movement, said motor, said driven wheel and said electro-magnet means into a self-contained unit, means adapted to detachably attach said Geneva movement to said projector feed shaft and for maintaining said slide film changer in operative position as a unit, and a leg having a supporting roller at its lower end, said leg being secured to said frame for supporting an end of said unit spaced from said Geneva movement in an elevated operative position with respect to the supporting circuits for said projector.

ROBERT A. LIGHTBURN.
MERVYN W. PALMER.

References Cited in the file of this patent

UNITED STATES PATENTS

| Number | Name | Date |
|---|---|---|
| 957,246 | Paulson | May 10, 1910 |
| 1,144,673 | Wheeler | June 29, 1915 |
| 1,186,069 | Blair | June 6, 1916 |
| 1,277,558 | Dumars et al. | Sept. 3, 1918 |
| 2,373,796 | Weidauer et al. | Apr. 17, 1945 |
| 2,497,765 | Guercio | Feb. 14, 1950 |
| 2,575,203 | Wolfner II | Nov. 13, 1951 |

FOREIGN PATENTS

| Number | Country | Date |
|---|---|---|
| 830,900 | France | May 23, 1938 |